United States Patent
Karr et al.

(10) Patent No.: US 7,657,717 B1
(45) Date of Patent: Feb. 2, 2010

(54) COHERENTLY SHARING ANY FORM OF INSTANT SNAPSHOTS SEPARATELY FROM BASE VOLUMES

(75) Inventors: Ronald S. Karr, Palo Alto, CA (US); Anand A. Kekre, Baner (IN)

(73) Assignee: Symantec Operating Corporation, Mountain View, CA (US)

( * ) Notice: Subject to any disclaimer, the term of this patent is extended or adjusted under 35 U.S.C. 154(b) by 542 days.

(21) Appl. No.: 10/770,358

(22) Filed: Feb. 2, 2004

(51) Int. Cl.
*G06F 12/16* (2006.01)

(52) U.S. Cl. .......................... 711/162; 711/161; 714/5; 714/6; 714/755

(58) Field of Classification Search .................. 711/161, 711/162; 714/5, 6, 755
See application file for complete search history.

(56) References Cited

U.S. PATENT DOCUMENTS

| | | | |
|---|---|---|---|
| 5,506,580 A | 4/1996 | Whiting et al. ................ 341/51 |
| 5,532,694 A | 7/1996 | Mayers et al. ................. 341/67 |
| 5,649,152 A | 7/1997 | Ohran et al. ................. 395/441 |
| 5,778,395 A | 7/1998 | Whiting et al. ............. 707/204 |
| 5,835,953 A | 11/1998 | Ohran ......................... 711/162 |
| 5,907,672 A | 5/1999 | Matze et al. ............ 395/182.06 |
| 6,073,222 A | 6/2000 | Ohran ......................... 711/162 |
| 6,085,298 A | 7/2000 | Ohran ......................... 711/162 |
| 6,141,734 A | 10/2000 | Razdan et al. .............. 711/144 |
| 6,212,531 B1 * | 4/2001 | Blea et al. ................... 707/204 |
| 6,222,558 B1 * | 4/2001 | Berg .......................... 345/619 |
| 6,564,301 B1 | 5/2003 | Middleton .................. 711/144 |
| 2005/0154845 A1 * | 7/2005 | Shackelford et al. ........ 711/162 |

* cited by examiner

*Primary Examiner*—Hong Kim
*Assistant Examiner*—Jae U Yu
(74) *Attorney, Agent, or Firm*—Campbell Stephenson LLP

(57) ABSTRACT

A computer system that implements a method for creating a virtual snapshot of a first storage object. A first storage object such as a data volume is created, wherein creating the first storage object includes creating a first storage object description. This first storage object description relates the first storage object to underlying first storage objects or first physical memory regions. After creating the first storage object, a virtual copy of the first storage object is created as a second storage object. Creating the second storage object includes creating a second storage object description, wherein the second storage object description relates the second storage object to the first storage object. The first storage object is transmitted to a first computer system, and the second storage object description is transmitted to a second computer system.

18 Claims, 5 Drawing Sheets

COHERENTLY SHARING ANY FORM OF INSTANT SNAPSHOTS SEPARATELY FROM BASE VOLUMES

BACKGROUND OF THE INVENTION

Businesses employ large scale data processing systems for storing and processing their business critical data. FIG. 1 illustrates relevant components of an exemplary data processing system 10. Data processing system 10 includes host (e.g., server computer system) 12 coupled to data storage subsystems 16-20 via a Fibre Channel switching fabric 22. For purposes of explanation, FIG. 1 shows switching fabric 22 consisting of a single switch 24 that connects hosts 12 and 14 to data storage subsystems 16-20, it being understood that the term switching fabric should not be limited thereto.

Each of the data storage subsystems 16-20 includes several physical storage devices. For purposes of explanation, data storage subsystems 16-20 are assumed to include several hard disks, it being understood that the term physical storage device should not be limited to hard disks. Data storage subsystems 16-20 may take different forms. For example, data storage subsystem 16 may consist of "Just a Bunch of Disks" (JBOD) connected to an array controller card. Data storage subsystem 18 may consist of an intelligent disk array. Data storage subsystem 20 may consist of a block server appliance. For purposes of explanation, each of the data storage subsystems 16-20 will take form in a disk array, it being understood that the term data storage subsystem should not be limited thereto.

As noted, each of the disk arrays includes several hard disks. The hard disk is the most popular permanent storage device currently used. A hard disk's total storage capacity is divided into many small chunks called physical memory blocks. For example, a 10 data byte hard disk contains 20 million physical memory blocks, with each block able to hold 512 bytes of data. Any random block can be written or read in about the same time, without having to read or write other physical memory blocks first. Once written, a physical memory block continues to hold data even after the hard disk is powered down. Hard disks are quite reliable.

Host 12 includes application 26 and a data storage management system 28 executing on one or more processors. Volume Manager™ provided by VERITAS Software Corporation of Mountain View, Calif., is an exemplary storage manager. Storage managers can perform several functions. More particularly, storage managers can create virtual storage devices (hereinafter storage objects) by aggregating hard disks such as those of disk arrays 16-20, underlying virtual storage devices, or both. FIG. 2 shows a visual representation of storage object VB consisting of an array of $n_{max}$ logical memory blocks that store or are configured to store data. While it is said that the logical memory blocks store or are configured to store data, in reality the data is stored in physical memory blocks of hard disks allocated directly or indirectly to the storage object.

Storage objects aggregated from hard disks of disk arrays 16-20 can themselves be aggregated to form storage objects called logical data volumes. Logical data volumes are typically presented for direct or indirect use by an application such as application 26 executing on host 12. In other words, an application can generate read or write transactions to read or write data to logical memory blocks of a data volume not knowing that the data volume is an aggregation of storage-level storage objects, which in turn are aggregations of hard disks.

Properties of storage objects depend on how the underlying storage objects or hard disks are aggregated. In other words, the method of aggregation determines the storage object type. In theory, there are a large number of possible methods of aggregation. The more common forms of aggregation include concatenated storage, striped storage, mirrored storage, or RAID storage. The storage types described above can also be compounded to yield still further storage types. For example, a storage object can be formed as mirrored stripes or striped mirrors. A more thorough discussion of how storage objects or hard disks can be aggregated and their advantages can be found within Dilip M. Ranade [2002], "Shared Data Clusters" Wiley Publishing, Inc., which is incorporated herein by reference in its entirety.

Storage managers are capable of creating storage object descriptions that describe the relationship between the storage object and its underlying storage objects or hard disks. These storage object descriptions can be used to map a logical memory block of the corresponding storage object to one or more logical memory blocks of one or more underlying storage objects or to one or more physical memory blocks of one or more hard disks. Storage managers can use storage object descriptions to translate data access transactions directed to one storage object into one or more transactions to access data of one or more underlying storage objects or hard disks. Consider a mirrored storage object O aggregated from two underlying hard disks d1 and d2 of disk arrays 16 and 18, respectively. Storage object O consists of $n_{max}$ logical memory blocks. Presume that a transaction is generated by some application, such as application 26, to write data D to logical memory block 3 of storage object O. A storage manager, such as storage manager 28, can access a description for storage object O in response to receiving the transaction for writing data D. From this description, storage manager 28 can learn that O is a two-way mirrored storage object and that logical memory block 3 is mapped to, for example, physical memory blocks 565 and 7668 in hard disks d1 and d2, respectively. Storage manager 28 generates and sends separate transactions to write data D to blocks 565 and 7668 in hard disks d1 and d2, respectively, of disk arrays 16 and 18, respectively. The separate transactions are transmitted via switch 24. It is noted that switch 24 may have a copy of the description for storage object O. Switch 24 may send the separate transactions to their appropriate disk array destinations according to the description for storage object O.

SUMMARY OF THE INVENTION

A computer system that implements a method for creating a virtual snapshot of a first storage object such as a data volume. A first storage object is created, wherein creating the first storage object includes creating a first storage object description. This first storage object description relates the first storage object to underlying first storage objects or first physical memory regions. After creating the first storage object, a virtual copy of the first storage object is created as a second storage object. Creating the second storage object includes creating a second storage object description, wherein the second storage object description relates the second storage object to the first storage object. The first storage object is transmitted to a first computer system, and the second storage object description is transmitted to a second computer system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
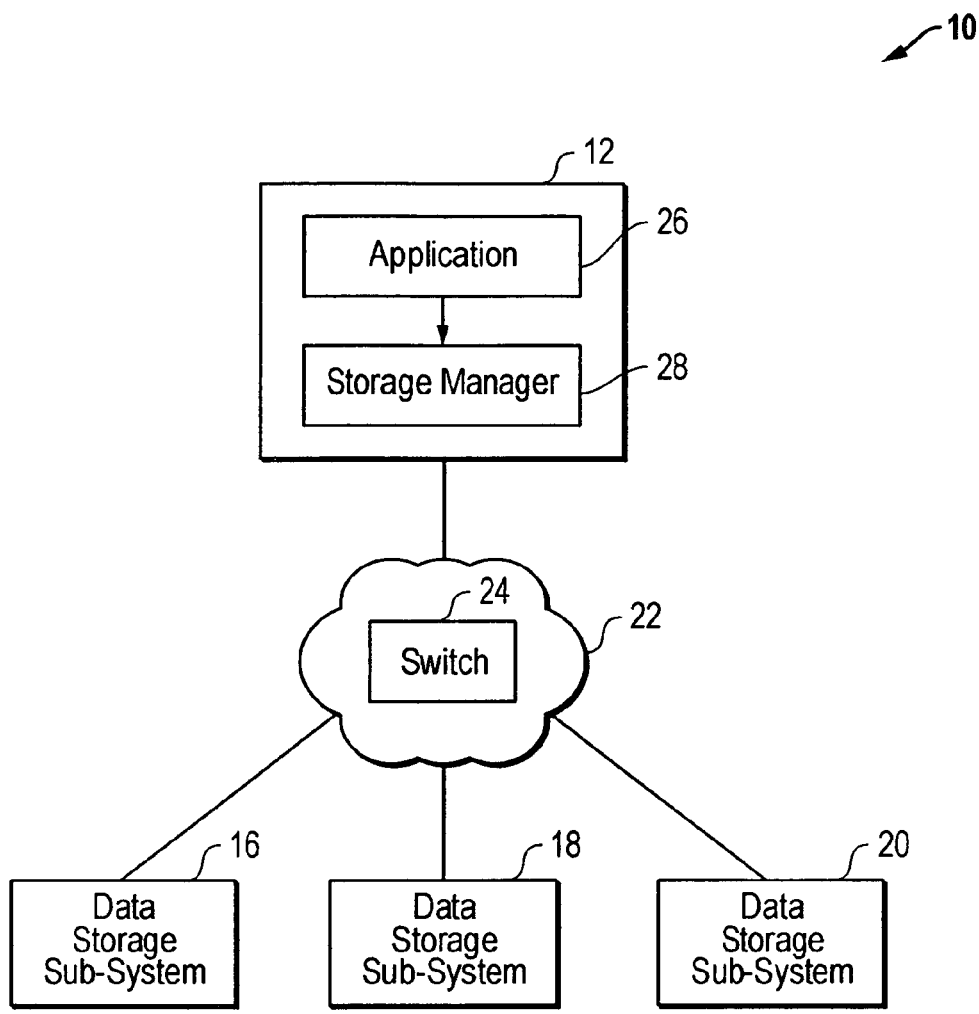
FIG. 1 illustrates a block diagram of a data system in which a logical data volume may be created.
Figure 2:
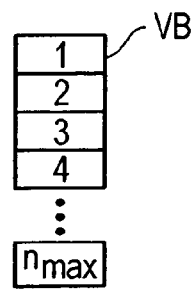
FIG. 2 illustrates a visual representation of the storage object created in the data system of FIG. 1.
Figure 3:
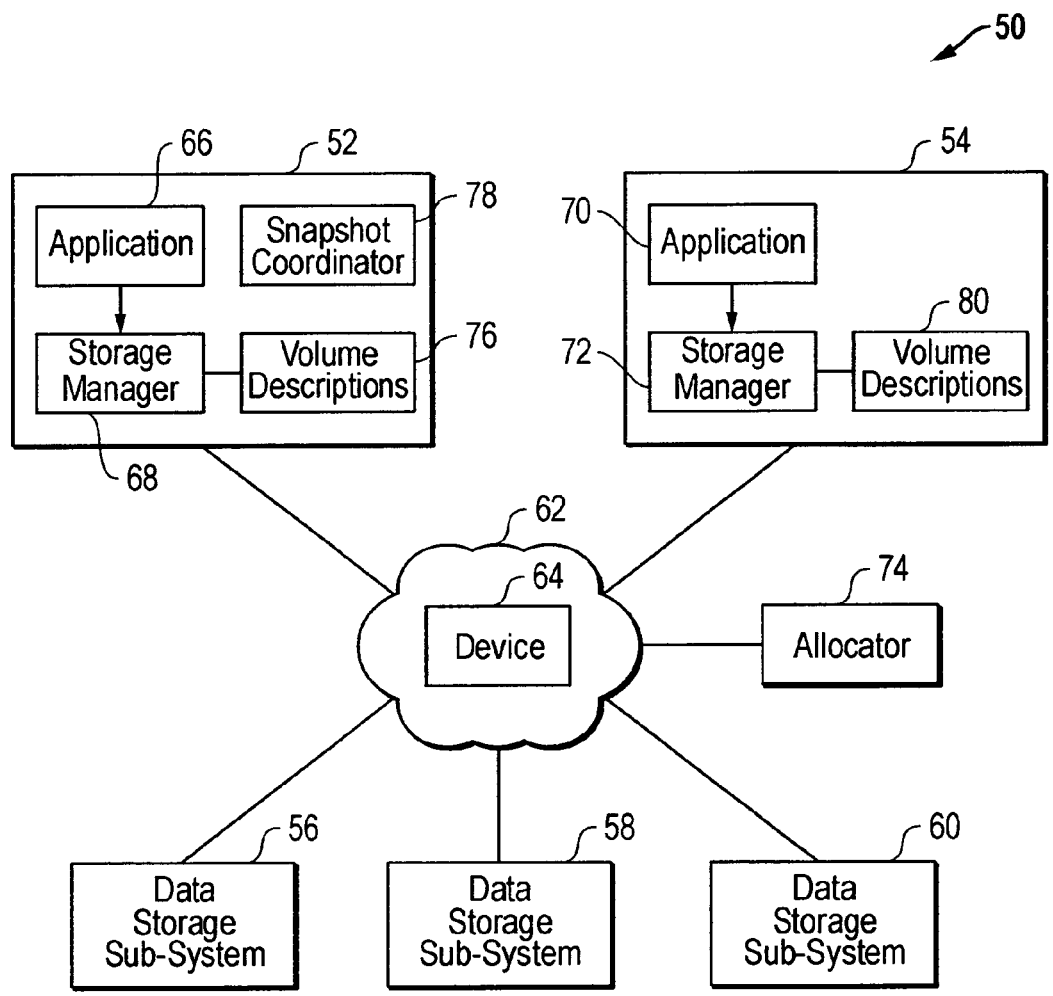
FIG. 3, illustrates a block diagram of a data system capable of implementing one embodiment of the present invention.

FIG. 3 illustrates in block diagram form, relevant components of an exemplary data processing system 50 employing one embodiment of the present invention. Is it noted that the present invention can be implemented as software instructions which can be executed on one more processors. Data processing system 50 includes a pair of hosts (e.g., server computer systems) 52 and 54 coupled to data storage subsystems 56-60 via a storage interconnect 62. Storage interconnect 62 may consist of several devices connected together. For purposes of explanation, FIG. 3 shows only device (e.g., a switch) 64 with in the storage interconnect 62. Device 64 may include memory for storing storage object descriptions. Each of the devices 52-60 and each device (e.g., device 64) in storage interconnect 62 includes one or more processors capable of processing data according to instructions of a software component such as a storage manager. As such, each of the devices 52-60 and each device (e.g., device 64) in storage interconnect 62 can be considered a computer system.

Data storage subsystems 56-60 may take different forms. For purposes of explanation only, each of the data storage subsystems 56-60 is implemented as a disk array, it being understood that the term data storage subsystem should not be limited thereto. Each of the disk arrays 56-60 includes several hard disks. Moreover, each of the disk arrays 56-60 may include a memory for storing storage object descriptions.

Data processing system 50 also includes a computer system (e.g., server) 74 for creating storage objects by aggregating underlying storage objects, hard disks, or both. Computer system 74 can distribute storage object descriptions it creates to each of the devices in system 50 including hosts 52 and 54, device 64, and disk arrays 56-60. Alternatively, Computer system 74 can distribute components of storage object descriptions it creates to each of the devices in system 50 including hosts 52 and 54, device 64, and disk arrays 56-60. Lastly, computer system 74 can modify a storage object description as the corresponding storage object is modified to, for example, increase or decrease the storage object capacity, create, modify, or remove snapshots of the storage object; add structure for new capability (e.g., redundancy), etc. Modified storage object descriptions can be distributed to any device in system 50 in whole or in part. Computer system 74 will be referred to below as allocator 74.

Host 52 includes an application 66, storage manager 68, and a snapshot coordinator 78. Host 52 also includes a memory 76 for storing object (e.g., logical data volume) descriptions. Host 54 includes an application 70 and a storage manager 72. Host 54 includes a memory 80 for storing object (e.g., logical data volume) descriptions.

Although not shown, each disk arrays 56-60 includes a storage manager for translating transactions for reading or writing data to storage objects. More particularly, storage managers within disk arrays 56-60 use descriptions provided by allocator 74 for mapping logical memory blocks of storage objects to one or more physical memory blocks of one or more underlying hard disks. Device 64 may include a storage manager for transacting write requests or read requests from hosts 52 or 54. However, it will be presumed device 64 does not use its storage manager to translate transactions to read or write data to a storage object. Device 64 might use a storage manager and/or storage object description to redirect read or write transactions generated by host 52 or host 54 to the appropriate disk array 56-60. It is noted that disk arrays 56-60 may receive from hosts 52 or 54 transactions for reading or writing data directly to hard disks.

Figure 4A:
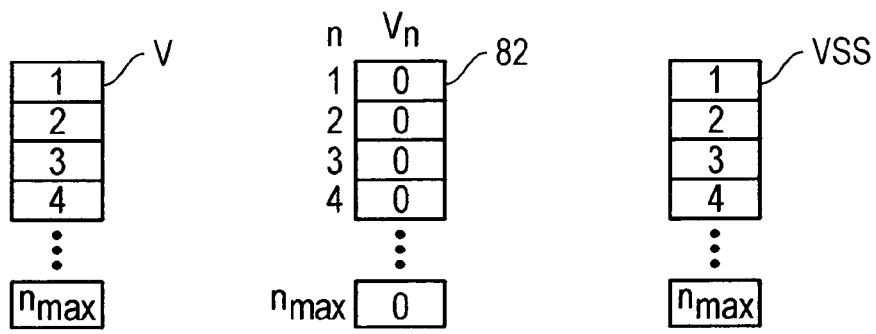
FIGS. 4a-4c show visual representations of a logical data volume, a virtual snapshot copy of the logical volume, and a data validity table created in the data system of FIG. 1.

System 50 includes a logical data volume V for storing critical data. FIG. 4A illustrates in block diagram form a visual representation of logical volume V. Volume V is shown having $n_{max}$ logical memory blocks into which data can be or is stored. While it is said that logical memory blocks of volume V store or are configured to store data, in reality, the data is stored in physical memory blocks of hard disks allocated directly or indirectly to volume V. For purposes of explanation volume V is formed by aggregating two storage objects, M0 and M1 to create a two-way mirrored volume, it being understood that volume V can be aggregated from underlying storage objects and/or hard disks to create a different type of storage (e.g., a striped mirror). Presume storage object M0 is formed by concatenating hard disks d1 and d2 from disk array 56 and storage object M1 is formed by concatenating hard disks d3 and d4 from disk array 58. When volume V is created, allocator 74 creates descriptions for each of the storage objects V, M0, and M1. Alternatively, allocator creates a unified storage object description that defines the relationship of volume V to hard disks d1-d4.

These storage object descriptions are distributed for subsequent use. In one embodiment, allocator 74 transmits the description for volume V to host 52 for storage within volume description memory 76. Allocator 74 may also transmit the description for volume V to device 64 (or several devices within interconnect 62) for storage therein. Likewise, allocator 74 transmits descriptions for storage objects M0 and M1 to disk arrays 56 and 58, respectively, for storage therein. In an alternative embodiment, allocator transmits the unified description mentioned above to one or more of host 52, device 64 and disk arrays 56-60 for storage therein.

Application 66 generates transactions for reading or writing data to volume V. The transactions are generated in response to requests received by client computer systems (not shown) coupled to host 52. The transactions generated by application 66 are provided to storage manager 68. Storage manager 68, in response to receiving, for example, a transaction to write data D to logical memory block n of volume V, accesses the description within memory 76 for volume V to determine that block n of volume V is mapped to block n of storage objects M0 and M1. Alternatively, if the unified description set forth above is contained in memory 76 rather than the description for volume V, storage manager 68 will determine that block n of volume V is mapped to a particular physical memory block in disk d1 or d2. Or storage manager 68 may use only a portion (i.e., the portion that indicates that volume V is as a mirrored volume out of storage objects M1 and M2) of the unified description to determine that block n of volume V is mapped to block n of storage objects M0 and M1. It will be presumed, however, that memory 68 stores the description for volume V, and not the unified description mentioned above.

In response to determining that block n of volume V is mapped to block n of storage objects M0 and M1, storage manager 68 generates separate transactions for writing data D to block n of storage objects M0 and M1. These transactions are transmitted to disk arrays 56 and 58, respectively, via device 64. It is noted that one or more storage object descriptions in device 64 may be used to forward the separate transactions to the proper disk array destination.

The storage manager within disk array 56 receives the write transaction from host 52. In response, storage manager within disk array 56 accesses the description of data object M0. From this description, the storage manager within disk array 56 learns that a logical memory block n of storage object M0 is mapped to physical memory block x within disk d1, and in response data D is written to memory block x of hard disk d1. Alternatively, storage manager in disk array 56 could access its copy of the unified description mentioned above to learn that logical memory block n of storage object M0 is mapped to physical memory block x within disk d1. However, it will be presumed that the storage manager in disk array 56 has access to the description for storage object M0 and not the unified description.

Likewise storage manager within disk array 58 accesses the description of data object M1. From this description, the storage manager within disk array 58 learns that a logical memory block n of storage object M1 is mapped to physical memory block y within hard disk d4, and data D is written to memory block y of hard disk d4. Alternatively, storage manager in disk array 58 could access its copy of the unified description mentioned above to learn that logical memory block n of storage object M1 is mapped to physical memory block y within disk d4. However, it will be presumed that the storage manager in disk array 58 has access to the description for storage object M0 and not the unified description Allocator 74 or other device in system 50 can create a storage object called a virtual snapshot (VSS) copy of volume V. A snapshot copy of a volume is a copy of the volume created at some point in time. The virtual snapshot VSS of volume V is created by first aggregating hard disks or underlying storage objects. The hard disks or underlying storage objects can be aggregated to create any type of storage (e.g., a mirrored stripe). For purposes of explanation only, allocator 74 aggregates disks d5, d6, and d7 within disk array 58 to create concatenated storage object C0, and allocator 74 aggregates disks d8, d9, and d10 within disk array 60 to create concatenated storage object C1. Lastly, allocator 74 aggregates storage objects C0 and C1 to create the virtual snapshot VSS as a striped volume. A description is created by aggregator 74 which defines VSS as a striped volume created from an aggregation of C0 and C1. The description for VSS should also include information indicating that VSS is a snapshot of volume V. Allocator 74 also modifies the existing description for volume V to indicate that volume VSS is a snapshot of volume V. Alternatively, allocator can create a unified description which indirectly relates VSS to hard disks d5-d10 and which includes an indication that VSS is a snapshot of volume V.

Once descriptions for V, VSS, C0, and C1 are generated or modified, they are distributed to devices in system 50. More particularly, the modified description for volume V is provided to host 52. The prior description for volume V within memory 76 is overwritten with the modified description for volume V. The description for VSS, is also provided to host 52 and stored with memory 76. A modified description for volume V and the newly created description for VSS are provided to host 54 and stored within memory 80. Descriptions for storage objects C0 and C1 are provided to disk arrays 58 and 59, respectively, and stored therein. Alternatively, the modified description for V and the unified description for VSS mentioned above may be distributed to one or more of devices 52-60 and 64 in system 50. However, for purposes of explanation, it will be presumed that descriptions for V, VSS, C0, and C1 are distributed as set forth above.

FIG. 4A shows a visual representation of virtual snapshot VSS. Snapshot VSS contains $n_{max}$ logical memory blocks corresponding to the $n_{max}$ logical memory blocks of volume V, respectively. Each logical memory block n in VSS is configured to store a copy of the data contained within block n of volume V. Again, it is noted that logical memory blocks are abstractions and do not actually store data. Rather, the data is stored in one or more physical memory blocks directly or indirectly allocated thereto by one or more storage object descriptions.

The virtual snapshot VSS can be eventually transformed into a real snapshot of volume V. When transformed into a real snapshot, each logical block n of VSS contains a copy or a modified copy of data in block n of volume V at the time VSS was first created. The present invention allows read or write access to volume V or VSS before VSS is transformed into a real snapshot copy. This concept will be more fully described below.

A validity map such as validity map 82 shown in FIG. 4A, is also created when VSS is first created. This validity map is provided to snapshot coordinator 78 and stored in memory thereof. The validity map 82 includes $n_{max}$ entries corresponding to the respective $n_{max}$ logical memory blocks of volume V and virtual snapshot VSS. Each entry $V_n$ indicates whether logical memory block n of instant snapshot VSS contains valid data. Thus, when $V_n$ is set to logical zero, logical block n of VSS does not contain valid data, and when $V_n$ is set to logical one, logical memory block n of VSS is said to contain valid data. Initially, all entries $V_n$ are set to logical zero as shown in FIG. 4A

Figure 5:
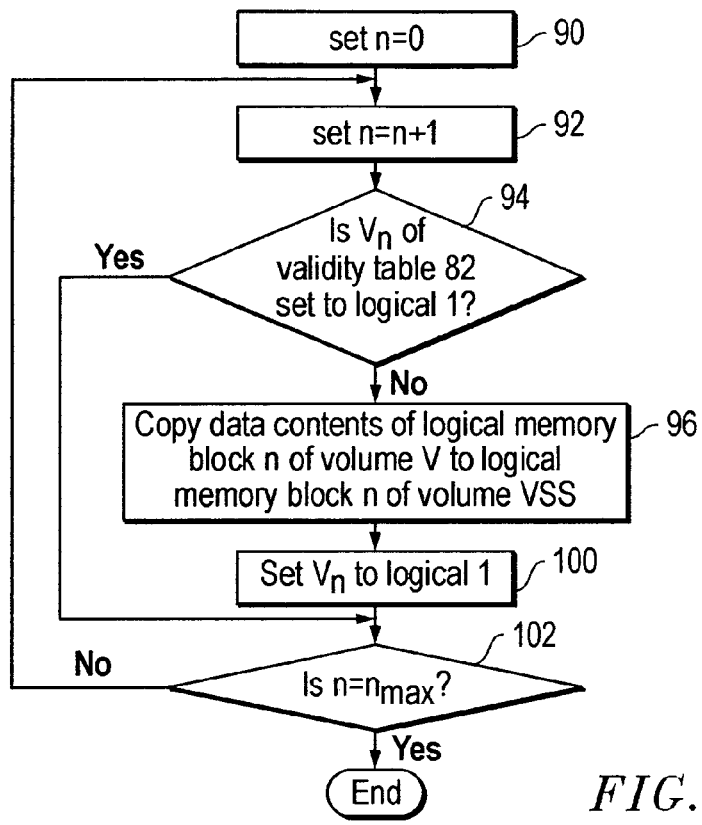
FIG. 5 is a flow chart illustrating relevant aspects of a background copying process.

As noted, the virtual snapshot VSS can be transformed into real snapshot copy of volume V by a background copying process (not shown) executing, for example, on host 52. FIG. 5 illustrates relevant aspects of this background copying process. More particularly, the copying process begins in step 90 by setting variable n to zero. Thereafter, in step 92 n is incremented by one. In step 94 validity table 82 is accessed to determine the state of $V_n$ therein. If $V_n$ is set to a logical one, then logical memory block n in VSS contains valid data and the process proceeds to step 102. If, however, in step 94 $V_n$ is set to logical zero, then block n of VSS lacks valid data. If that is the case the process proceeds to step 96 in which the data contents of logical block n of volume V is copied to logical block n of volume VSS.

The process of copying data according to step 96 includes issuing a transaction to read data from logical block n of volume V. This read transaction is provided to storage manager 68. Storage manager 68 accesses the description for volume V and subsequently determines that logical block n of volume V is mapped to block n of storage objects M0 and M1. Given that volume V is a mirrored volume, logical block n of storage objects M0 is identical in content to the data content of logical block n of M1. Accordingly, storage manager 68 generates a single read transaction for reading the data from block n of either storage object M0. For purposes of explanation, manager 68 generates a read transaction for reading the data from block n of M0. This read transaction is transmitted to disk array 56 via device 64.

Figure 4B:
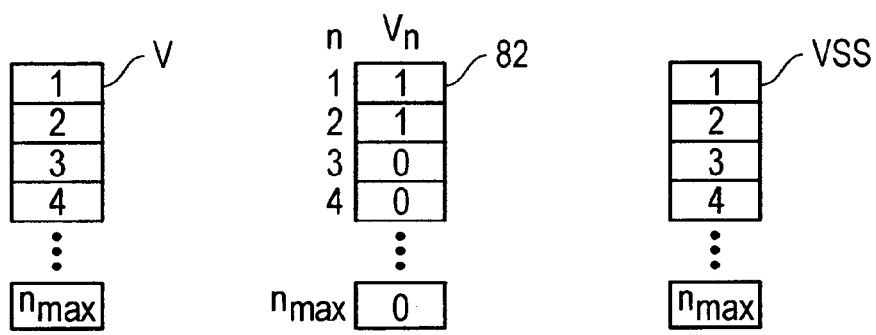
Figure 4C:
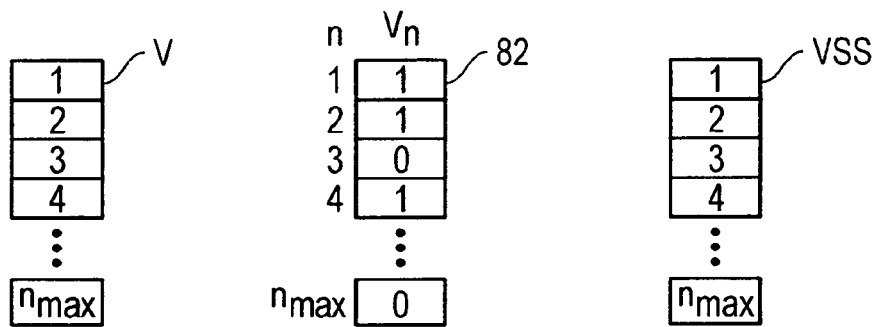

The storage manager contained within disk array 56, receives the read transaction directed to logical block n of storage object M0 and, in response, may access the description in memory for storage object M0. The description for storage object M0 indicates that logical block n is mapped to physical memory block x in, for example, hard disk 1. Data $D_{copy}$ within physical memory block x is read and returned to host 52. Host 52, in response, generates a transaction to write data $D_{copy}$ to logical block n of volume VSS. Storage manager 68 receives this write transaction and accesses the description in memory 76 for volume VSS and learns that block n of volume VSS is mapped to, for example, block y of storage object C0. In response, storage manager 68 generates a write transaction for writing data $D_{copy}$ to block y of storage object C0. This write data transaction is transmitted to disk array 58 via device 54. In response, the storage manager in disk array 58 accesses its copy of the description for storage object C0 and learns that logical memory block y is mapped to physical memory block i within, for example, hard disk 6 of disk array 58. Physical memory block i is written with data $D_{copy}$, and in step 100 $V_n$ is set to logical 1. This process repeats beginning with step 92 until n equals $n_{max}$ as shown in step 102. FIG. 4B illustrates the state of validity map 82 after the background process of FIG. 5 has copied the data contents of logical memory blocks 1 and 2 of volume V to logical memory blocks 1 and 2, respectively, of virtual snapshot VSS.

As noted above, host 54 includes an application 70. Application 70 is distinct from application 66 in its function. For example, application 70 maybe processed for mining a volume according to some criteria. In contrast, application 66 maybe a business application that processes a data volume according to predetermined business rules. Application 70 is capable of reading or writing data from the virtual snapshot VSS before the virtual snapshot VSS is transformed into a real snapshot or modified real snapshot copy of volume V by the background copying process. Moreover, application 66 can access volume V with a read or write data transaction before virtual snapshot VSS before the virtual snapshot VSS is transformed into a real snapshot or modified real snapshot copy of volume V by the background copying process.

Figure 6:
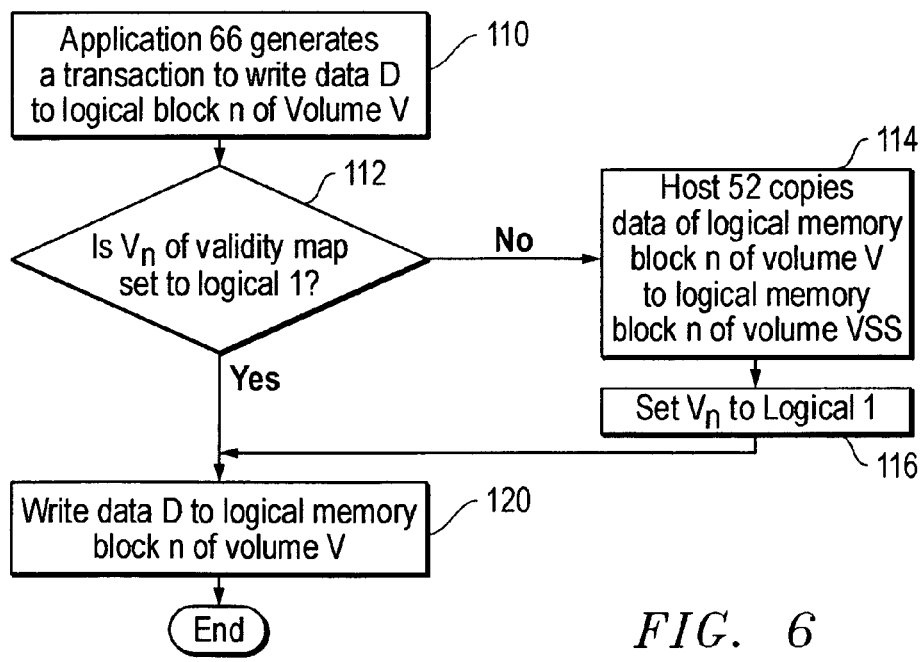
FIG. 6 is a flow chart illustrating relevant aspects of writing data to the logical volume created in the data system of FIG. 1.

FIG. 6 illustrates relevant operational aspects of writing data to volume V before the virtual snapshot VSS is transformed into real or modified real snapshot. The process of FIG. 6 initiates when application 66 generates a transaction to write data D to logical memory block n of volume V. In response to generation of this write data transaction, storage manager accesses the description of volume V stored in memory 76 and discovers that VSS is a snapshot copy of volume V. In response, the validity map 82 is accessed to determine the state of $V_n$ therein. If $V_n$ is set to logical one then application 70 is permitted to immediately write data D to block n of volume V as shown in step 120. However, $V_n$ is set to logical zero in step 112, then data existing within block n of volume V must first be copied to logical block n of volume VSS as shown in 114. The process for copying data in step 114 is similar to the process described with respect to step 96 in FIG. 5. Once, the data copying has been completed in step 114, $V_n$ is set to logical 1 within validity table 82 as shown in step 116. Thereafter, application 66 can write data to logical block n of volume V as shown in step 120.

Figure 7:
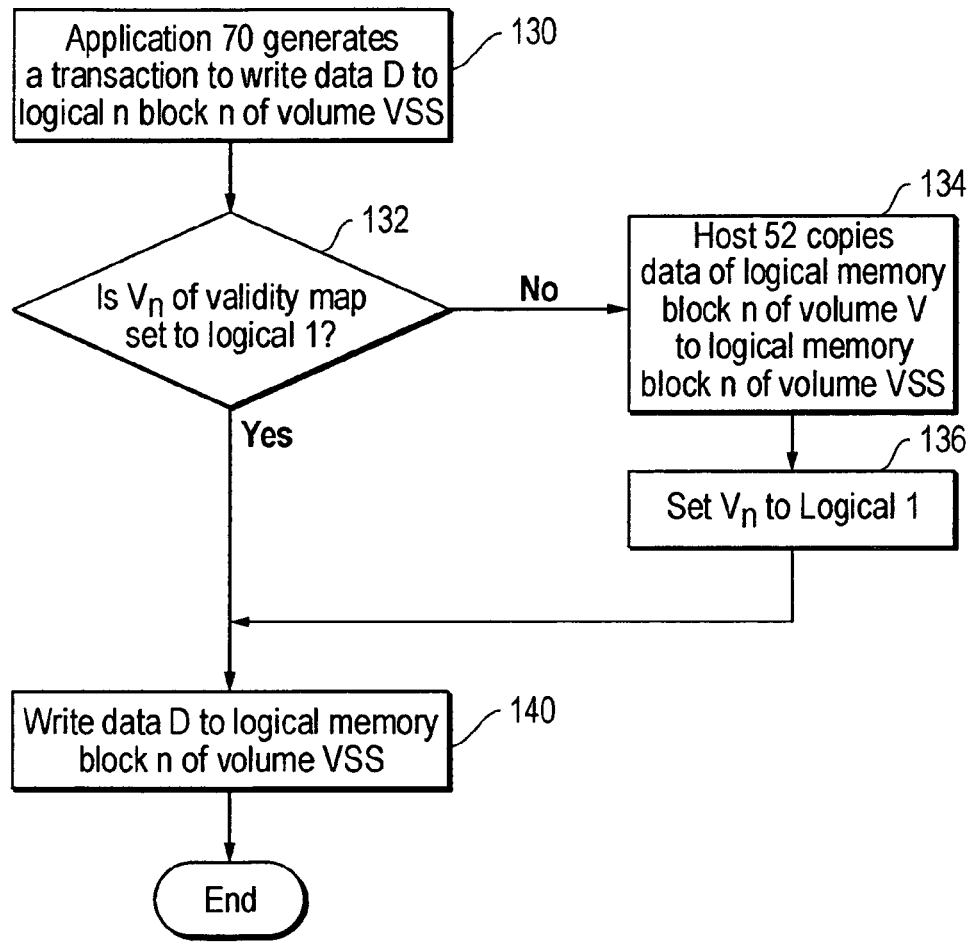
FIG. 7 is a flow chart illustrating relevant aspects of writing data to the snapshot volume created in the data system of FIG. 1.

As noted above, application 70 can also modify data in logical block n of VSS before virtual snapshot VSS is transformed into a real snapshot. FIG. 7 illustrates relevant operational aspects of this process. More particularly, the process in FIG. 7 starts in step 130 when application 70 generates a transaction to write data D to block n of volume VSS. Storage manager 72 notices from the description of VSS in memory 80 that VSS is a snapshot copy of volume V. Unless all data in logical memory block n of VSS will be overwritten with data D, host 54 transmits a message to host 52 indicating that host 54 seeks to modify data within block n of volume VSS. Host 52 receives the message from host 54, and in response, accesses validity map 82 to determine the state of $V_n$ therein. If $V_n$ is set to logical 0, the virtual snapshot VSS does not have valid data in logical block n thereof. In this case, the process proceeds to step 134 where host 52 copies data of logical memory block n of volume V to logical memory block n of VSS in the manner similar to that described with respect to step 96 of FIG. 5. Thereafter, host 52 sets $V_n$ to logical 1 within validity table 8. After $V_n$ is switched to logical one or in response to determining that $V_n$ was previously set to logical 1, host 52 sends a reply message to host 54 indicating that $V_n$ is set to logical 1.

Storage manager 72 in host 54 delays processing of the write data transaction generated in step 130 until host 54 receives the reply message from host 52. Once the reply message is received, application 70 writes data D to logical block n of volume VSS and the process ends.

It is noted that application 70 can read data from VSS before VSS is transformed into a real snapshot or a modified real snapshot by the background process above. To illustrate, suppose application 70 generates a transaction to read data from block n of volume VSS. Storage manager 72 accesses the description of VSS in memory 80 in response to receiving the read transaction and notices from the description that VSS is a snapshot copy of volume V. Host 54 does not know at this point whether block n contains valid data. To discover this information, host 54 transmits a message to host 52 indicating that host 54 seeks to read data from block n of volume VSS. Host 52 receives the message from host 54, and in response, accesses validity map 82 to determine the state of $V_n$ therein. Host 52 then sends a response message back to host 54 identifying the state of $V_n$. If $V_n$ is set to logical 0, the requested data can be retrieved from block n of volume V. Accordingly, a request to read data in block n of volume V is generated and provided to storage manager 72. Storage manager 2, in turn, accesses the description of volume V in memory 80 to learn that logical block n of volume V is mapped to logical block n in storage objects M0 and M1. Given that volume V is a mirrored volume according to its description, logical block n of storage objects M0 is identical in content to the data content of logical block n of M1. Accordingly, storage manager 72 generates a single read transaction for reading the data from block n of either storage object M0. For purposes of explanation, manager 68 generates a read transaction for reading the data from block n of M0. This read transaction is transmitted to disk array 56 via device 64.

The storage manager contained within disk array 56, receives the read transaction directed to logical block n of storage object M0 and, in response, may access the description in memory for storage object M0. The description for storage object M0 indicates that logical block n is mapped to physical memory block x in, for example, hard disk 2. Data D read within physical memory block x is read and returned to host 54.

The present invention was described above with reference to the creation of a volume V and a virtual snapshot of volume V, both of which were presented for processing to applications 66 and 70, respectively. Virtual snapshots of storage objects other than a data volume can also be created. For example, aggregator 74 or other device may create a virtual snapshot of storage object M0, one of the storage objects aggregated to form volume V. The present invention will be described below with reference to the creation of a virtual snapshot of storage object M0 it being understood that the present invention should not be limited thereto. For purposes of explanation, this virtual snapshot of M0 will be referred to as MSS. The description for virtual snapshot MSS can be created and subsequently distributed to several devices in system 50. For purposes of explanation, the description for virtual snapshot MSS will be distributed and used by disk arrays 56 and 60 in the manner described below. It should be noted that the description for virtual snapshot MSS could be distributed and used by other devices such as devices in interconnect 62.

The virtual snapshot MSS of storage object M0 is created by first aggregating hard disks or underlying storage objects. For the purposes of explanation, MSS will be created by aggregating hard disks 11 and 12 of disk array 60. Hard disks 11 and 12 can be aggregated to create several types of storage. For purposes of explanation, hard 11 and 12 are aggregated to create concatenated storage. Aggregator 74 creates a description for MSS that defines MSS as a concatenated aggregation of disks 11 and 12 and as a virtual copy of M0. Aggregator 74 distribute the description for MSS to disk arrays 56 and 60 for storage in memory therein. The description for M0 should also be updated to indicate that MSS is a virtual copy of M0, and the updated description for M0 can be distributed to devices in system 50 including disk arrays 56 and 60 for storage in memory therein. For purposes of explanation, it will be presumed that the updated description for M0 is provided to disk arrays 56 and 60 only. The updated description for M0 overwrites the existing description for M0 in memory of disk array 56.

MSS is created to contain $n_{max}$ logical memory blocks corresponding to the $n_{max}$ logical memory blocks, respectively, of storage object M0. Each logical memory block n in MSS is configured to store a copy of the data contained within block n of storage object M0. The logical memory blocks of MSS are abstractions and do not actually store data. Rather, the data is stored in physical memory blocks of hard disks 11 an 12 aggregated to create MSS. Initially, each of the logical memory blocks in MSS contains no valid data. A validity map similar to validity map 82, is also created when MSS is first created. Each entry $V_n$ indicates whether logical memory block n of virtual object MSS contains valid data. This validity map is provided to disk array 56 and stored in memory thereof. Alternatively, the validity map for MSS may be provided elsewhere, including disk array 60 or host 52.

The virtual storage object MSS can be eventually transformed into a real copy of M0 by a background copying process. This background copying process is similar to that described with reference to FIG. 5 with step 96 replaced by a step (hereinafter the new step) of copying the data contents of logical memory block n of storage object M0 to logical memory block n of virtual copy MSS. When transformed into a real copy, each logical block n of MSS contains a copy or a modified copy of data in block n of storage object M0 at the time MSS was first created. M0 or MSS can be accessed by read or write transactions before MSS is transformed into to a real storage object.

The process of copying data according to the new step includes issuing a transaction to read data from logical block n of M0. This read transaction is provided to a storage manager in disk array 56. Storage manager in disk array 56 accesses its copy of the description for volume M0 and subsequently determines that logical block n of M0 is mapped to a physical block x of, for example hard disk 2. Data $D_{copy}$ within physical memory block x of hard disk 2 is read and returned to the device that is performing the background copying process. For purposes of explanation, it will be presumed that disk array 60 is performing this background copying process. Disk array 60, in response to receiving $D_{copy}$, generates a transaction to write data $D_{copy}$ to logical block n of MSS. Storage manager in disk array 60 receives this write transaction and accesses its for MSS and learns that block n of volume VSS is mapped to, for example, block y disk array 12.

Virtual snapshot MSS can be accessed with a read or write transaction before the virtual snapshot MSS is transformed into a real snapshot or modified real snapshot copy of M0 by the background copying process. Moreover, storage object M0 can be accessed with a read or write data transaction before virtual snapshot MSS is transformed into a real snapshot or modified real copy of M0 by the background copying process.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

We claim:

1. A method comprising:
   creating a first storage object, wherein creating the first storage object comprises a computer system creating a first storage object description, wherein the first storage object description comprises data that relates the first storage object to first underlying storage objects or to first physical memory regions;
   creating a second storage object as a virtual snapshot copy of the first storage object, wherein creating the second storage object comprises the computer system creating a second storage object description, wherein the second storage object description comprises data identifying the second storage object as a snapshot copy of the first storage object;
   adding to the first storage object description data identifying the second storage object as a snapshot copy of the first storage object;
   the computer system transmitting the first storage object description to a first computer system; and
   the computer system transmitting the second storage object description to a second computer system.

2. The method of claim 1 further comprising transmitting the first storage object description to the second computer system.

3. The method of claim 1 further comprising transmitting the second storage object description to the first computer system.

4. The method of claim 1 wherein the second storage object description comprises information relating the second storage object to second underlying storage objects or second physical memory regions.

5. The method of claim 1 further comprising:
   modifying the first storage description, and;
   transmitting the modified first storage object description to the first and second computer systems.

6. A method comprising:
   creating a second storage object, wherein
      the second storage object is created as a virtual snapshot copy of a first storage object,
      creating the second storage object comprises a computer system creating a description of the second storage object, and the description of the second storage object comprises data that relates the second storage object to second underlying storage objects;

adding data to a first storage object description to indicate that the first storage object is related to the second storage object;

the computer system transmitting the first storage object description to a first computer system; and the computer system transmitting the second storage object description to a second computer system.

7. The method of claim 6 wherein the data added to the first storage object description indicates that the second storage object is a snapshot copy to the first storage object.

8. The method of claim 6 wherein the first storage object description is transmitted to the first computer system after the data is added to the first storage object description.

9. The method of claim 6 further comprising:

transmitting the first storage object description to the second computer system after the data is added to the first storage object description to indicate that the first storage object is related to the second storage object;

transmitting the second storage object description to the first computer system.

10. A memory medium comprising instructions executable by a computer system, wherein the computer system implements a method in response to executing the instructions, the method comprising:

creating a first storage object, wherein creating the first storage object comprises creating a first storage object description, wherein the first storage object description comprises data that relates the first storage object to first underlying storage objects or to first physical memory regions;

creating a second storage object as a virtual snapshot copy of the first storage object, wherein creating the second storage object comprises creating a second storage object description, wherein the second storage object description comprises data identifying the second storage object as a snapshot copy of the first data object;

adding to the first storage object description data identifying the second storage object as a snapshot copy of the first storage object;

transmitting the first storage object description to a first computer system, and;

transmitting the second storage object description to a second computer system.

11. The memory medium of claim 10 wherein the method further comprises transmitting the first storage object description to the second computer system.

12. The memory medium of claim 10 wherein the method further comprises transmitting the second storage object description to the first computer system.

13. The memory medium of claim 10 wherein the second storage object description comprises information relating the second storage object to second underlying storage objects or second physical memory regions.

14. The memory medium of claim 10 wherein the method further comprises:

modifying the first storage object description, and;

transmitting the modified first storage description to the first and second computer systems.

15. A memory medium comprising instructions executable by a computer system, wherein the computer system implements a method in response to executing the instructions, the method comprising:

creating a second storage object, wherein the second storage object is created as a virtual snapshot copy of a first storage object, creating the second storage object comprises creating a second storage object description, and the second storage object description comprises data that relates the second storage object to second underlying storage objects;

adding data to a first storage object description to indicate that the first storage object is related to the second storage object;

transmitting the first storage object description to a first computer system; and transmitting the second storage object description to a second computer system.

16. The memory medium of claim 15 wherein the data added to the first storage object description indicates that the second storage object is a snapshot copy to the first storage object.

17. The memory medium of claim 15 wherein the first storage object description is transmitted to the first computer system after the data is added to the first storage object description.

18. The memory medium of claim 15 wherein the method further comprises:

transmitting the first storage object description to the second computer system after the data is added to the first storage object description to indicate that the first storage object is related to the second storage object;

transmitting the second storage object description to the first computer system.

* * * * *